United States Patent

MacMullan et al.

[15] 3,686,568
[45] Aug. 22, 1972

[54] NULL-BALANCE SERVO SYSTEM

[72] Inventors: Samuel J. MacMullan, Newtown; Albert J. Williams, Jr., Ambler, both of Pa.

[73] Assignee: Leeds & Northrup Company, North Wales, Pa.

[22] Filed: March 19, 1970

[21] Appl. No.: 20,885

[52] U.S. Cl. ............... 324/99 R, 318/566, 318/617, 324/100
[51] Int. Cl. ......................... G01r 17/06, G01r 13/04
[58] Field of Search ....324/99, 100, 123; 346/32, 31; 318/566, 617, 632, 633, 635; 340/186, 187

[56] References Cited

UNITED STATES PATENTS

| | | | |
|---|---|---|---|
| 3,281,685 | 10/1966 | Talbot, Jr. | 324/99 |
| 3,493,826 | 2/1970 | Wandrey | 318/617 |
| 3,201,675 | 8/1965 | Curran et al. | 318/566 |
| 3,489,889 | 1/1970 | Escobosa | 318/566 X |
| 3,510,737 | 5/1970 | Brown et al. | 318/566 |
| 3,114,869 | 12/1963 | Goodwin | 318/617 |

*Primary Examiner*—Rudolph V. Rolinec
*Assistant Examiner*—Ernest F. Karlsen
*Attorney*—Woodcock, Washburn, Kurtz & Markiewicz

[57] ABSTRACT

A high speed null-balance servo measuring system having a D.C. motor with a prescribed current limit which is operated to drive an adjustable balancing circuit element with maximum speed and without overshoot. A small velocity feedback circuit provides damping when the velocity is small, and a large velocity feedback circuit provides damping when the velocity is sufficiently large to exceed a threshold level. A current limiting circuit constrains the current through the motor within the prescribed limit. In some embodiments, the current limiting circuit is a feedback circuit.

12 Claims, 5 Drawing Figures

3,686,568

NULL-BALANCE SERVO SYSTEM

BACKGROUND OF THE INVENTION

1. Field of the Invention

This invention relates to a null-balance servo system, and more particularly, to a high speed null-balance servo system for measuring an input signal.

High speed balancing is particularly desirable in a servo system for measuring a rapidly varying input signal; i.e., a null-balance recorder where it is desirable to precisely duplicate the input signal at the output. Slowly varying input signals are not difficult to duplicate. However, a large rapidly varying input signal or an input signal having a large rate of change such as with a step input signal, is difficult to duplicate for three reasons. First, the acceleration requirements for the balancing motor may require motor input sufficient to damage the motor thereby requiring a current constraint. Second, with the current constraint, the necessary high velocity response of the motor may result in overshoot even though proportional or continuous velocity damping is provided. Third, when the necessary high velocity response of the motor is achieved without overshoot for a large change and a large rate of change in the input signal, the velocity response of the motor for a small change and a large rate of change in the input signal is too slow.

2. The Prior Art

Some difficulties of achieving appropriate response from a null-balance servo system to step input signals have been recognized in the prior art. For example, "Dual-mode Servo Compensation," Gehmlich, Control Engineering, May, 1958, pages 119–123 discloses non-linear compensation for dealing with one problem. More particularly, nonlinear compensation is disclosed which provides proportional or continuous control for small error or error rates characteristic of slowly varying input signals and full saturating torque for large error or error rates characteristic of rapidly varying input signals or step input signals.

The Gehmlich system is able to achieve high velocity from the balancing motor but without regard to any torque limitation of the motor. This means that the Gehmlich system is not concerned with nonlinear tachometric action for a small servo, such as a null-balance recorder, which action is necessary to prevent exceeding the torque limit of a small balancing motor.

SUMMARY OF THE INVENTION

It is an object of this invention to achieve balancing of a null-balance recorder in a minimum of time.

It is another object of this invention to achieve balancing of a null-balance recorder without substantial overshoot for all on-scale input signals including input signals characterized by large changes and large rates of change.

It is a further object of this invention to achieve balancing of a null-balance recorder without exceeding the current tolerance of the balancing motor.

It is a still further object of this invention to protect the balancing motor from excessive on-scale and off-scale input signals.

In accordance with these and other objects of this invention, a null-balance servo system is provided for measuring an input signal comprising an adjustable circuit element for restoring balance, a detector responsive to the unbalance of the adjustable circuit element, and a motor responsive to the output of the detector for adjusting the adjustable circuit element in a direction to restore balance to the servo system. The detector comprises means for producing an error signal substantially proportional to the unbalance of the adjustable circuit element reduced by a small velocity feedback signal proportional to the rate of adjustment of the adjustable circuit element. In order to prevent substantial overshoot for large step input signals, the detector comprises means for further reducing the error signal by a large velocity feedback signal proportional to the difference between the rate of adjustment of the adjustable circuit element and a predetermined threshold when the rate exceeds a predetermined threshold. In order to prevent motor damage, means are provided for constraining the current through the motor, the current constraint dominating control of the motor when a current threshold is exceeded and returning control of the motor to the error signal when current constraint is no longer needed.

BRIEF DESCRIPTION OF THE DRAWINGS

For further objects and advantages of the invention and for a more detailed explanation of the operation thereof, reference is now made to the following description taken in conjunction with the accompanying drawings in which.

DESCRIPTION OF THE PREFERRED EMBODIMENTS

Figure 1:
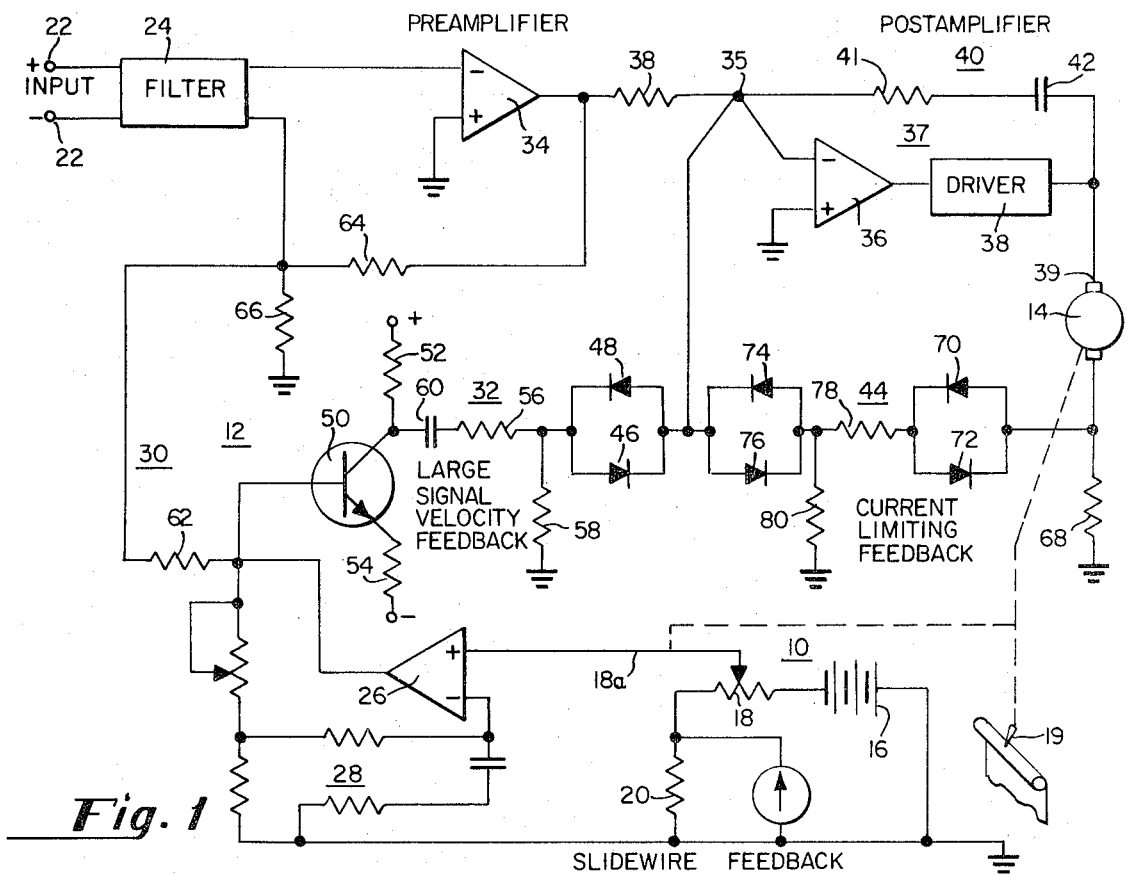
FIG. 1 schematically illustrates a preferred embodiment of the invention.

A null-balance servo system in the form of a null-balance recorder for measuring an unknown electrical input signal is disclosed in FIG. 1. The recorder comprises an adjustable circuit 10 including an adjustable circuit element for restoring balance to the system, a detector 12 responsive to the unbalance of the system, and a motor 14 responsive to the output of the detector 12 for adjusting the adjustable circuit 10 in a direction to restore balance to the system.

The adjustable circuit 10 is substantially conventional for the null-balance recorder art and includes a suitable constant D.C. power supply 16 connected across an adjustable circuit element in the form of a slidewire 18 and a series connected resistor 20. A slidewire contact 18a provides a feedback signal to the detector 12 to indicate the position of a recorder pen 19 coupled to the contact 18a. The motor 14, which is also substantially conventional in the null-balance recorder art, is coupled to the contact 18a and the slidewire 18 to restore balance to the system.

Briefly, the motor may be characterized as a D.C. motor having a low inertia where torque is proportional to D.C. current and the steady state velocity is proportional to D.C. voltage. This characteristic is found in a motor of the fixed field type which generally is the result of a permanent magnet. Motor damage may be caused by demagnetization of the permanent magnet in the motor or by overheating of the motor. Constraining or limiting the current through the motor to a tolerable level prevents motor damage.

The detector 12 both senses the balance of the system and drives the motor 14 as will be clear from the following explanation. An input signal is applied to input terminals 22 and a low pass filter 24 of the detector 12. A position feedback signal proportional to the position of the slidewire contact 18a is applied to one input terminal of a differential amplifier 26. By differentiating the position signal with an active network comprising an R.C. network 28 and the amplifier 26 with the network 28 coupled between the other input terminal and the output terminal of the amplifier 26, a velocity feedback signal proportional to the rate of adjustment of the contact 18a is obtained. Both the position feedback signal and the velocity feedback signal are component voltages of the voltage sum at the output terminal of the amplifier 26.

The input signal, the position feedback signal, and a small velocity feedback are applied to the operational amplifier 34. In order to derive an error signal corresponding to the unbalance of the recorder which, for purposes of continuous damping, is reduced by the small velocity feedback signal, the detector comprises a position and small velocity signal feedback circuit 30 to permit comparison of the input signal with the apportioned sum of the position signal and the velocity signal at the input terminals of a preamplifier comprising an operational amplifier 34.

The reduced error signal at the output of the operational amplifier 34, a large velocity feedback signal, and a compensating feedback signal are applied to the input of the operational amplifier 36. The reduced error signal from the output terminal of the operational amplifier 34 is applied to the summing input terminal of the operational amplifier 36 through a coupling resistor 38. The large velocity feedback signal, which provides additional damping when the rate of adjustment of the velocity contact 18a exceeds a threshold level corresponding to a large velocity signal, is obtained from a large velocity and threshold establishing feedback circuit 32 of the detector for apportioning and applying the large velocity feedback signal, phase inverted, to a summing input terminal 35 of an operational amplifier 36 in a postamplifier 37, the summing input terminal 35 being maintained at virtual ground.

A frequency dependent compensating network 40 of the postamplifier 37 comprising a resistor 41 and a capacitor 42 is connected between the summing input terminal of the operational amplifier 36 and the output of the driver 38 to couple the compensating feedback signal to the input of the operational amplifier 36. Note that the output compensating network 40 is injected at or after the summing input terminal 35 so that a reduced error signal acts upon the compensating network to prevent excessive energy storage in the capacitor 42. As shown, the output of the compensating network 40 is injected at the summing terminal 35. The input of the compensating network 40 is obtained from an ungrounded terminal 39 of the motor common to the postamplifier 37. The voltage on the terminal 39 includes an important component proportional to the velocity of the motor and ideally suited for the input to the compensating network 40.

The resulting further reduced error signal at the output terminal of the operational amplifier 36 is then amplified by a driver 38 and applied to the balancing motor 14 which in turn drives the contact 18a to restore balance to the recorder.

When the error signal is sufficiently large as in the case of a large step input signal, the output of the postamplifier 37 might be excessively large in the absence of any constraint. In order to constrain the current through the motor to a safe level for the motor 14 under such a condition, the detector also comprises a current limiting circuit 44 which is coupled between the input summing terminal 35 of the operational amplifier 36 and the motor 14. The current limiting circuit 44 applies a current limiting feedback signal to the input summing terminal to still further reduce the error signal but only when a threshold level is exceeded. The current constraint provided maintains the current through the motor 14 substantially constant for such a large error signal as will be described subsequently.

In order to establish a threshold in the large velocity signal feedback circuit 32, a pair of parallel oppositely poled rectifying devices or diodes 46 and 48 are provided, one of which is conductive when the large velocity feedback signal exceeds the threshold level. The large signal velocity feedback circuit also comprises a phase inverter 50 appropriately biased by resistors 52 and 54 connected to the power supply so as to make the large signal velocity feedback a negative feedback. An attenuator comprising a series resistor 56 and a shunt resistor 58 is further provided in combination with a capacitor 60 such that the combination has a R.C. product which will cancel out the component of the feedback signal which is proportional to acceleration. The capacitor 60 also blocks the component of the feedback proportional to position.

The position and small velocity signal feedback circuit 30 comprises an attenuator including series resistors 62 and 64 and a shunt resistor 66. Since the position and small velocity signal feedback circuit 32 is adapted to provide continuous or proportional feedback, there are no means for establishing a threshold.

Since current limiting feedback circuit 44 is required to provide a current limiting feedback only when a current sensing resistor 68 in series with the motor 14 senses current in excess of a predetermined prescribed level, means for establishing a threshold are necessary. Accordingly, parallel and oppositely poled diodes 70 and 72 are provided to establish the necessary threshold for the current limiting feedback circuit 44. A similar pair of oppositely poled parallel diodes 74 and 76 also establish the threshold and isolate the remainder of the current limiting feedback circuit 44 from the summing input terminal 35 of the operational amplifier 36. An attenuator including a series resistor 78 and a shunt resistor 80 is coupled between the pairs of oppositely poled diodes, the series resistor 78 determining the dynamic current gain of the operational amplifier 36 and the shunt resistor preventing small leakage currents from flowing to the summing input terminal of the operational amplifier 36 under small signal conditions. For increasing inputs at terminals 22, the current through resistor 38 will increase and the current through the motor can be made to increase up to the threshold level and slightly above for on-scale inputs. The phrase "current constraint" refers to this action. Saturation of the amplifier 34 insures that the current constraint action can limit the motor current even for off-scale inputs.

In brief summary, the position and small velocity signal feedback circuit 30 will operate continually to provide an error signal reduced by the small velocity feedback signal regardless of the rate of change of the input signal or the size of the error signal. However, the large velocity feedback circuit 32 will only provide a signal to further reduce the error signal when the rate of change of the input signal is sufficiently rapid or the error signal is sufficiently large so as to produce a large velocity feedback signal which exceeds the threshold established by diodes 46 and 48. Similarly, the current limiting feedback circuit 44 will only permit a current limiting feedback signal to still further reduce the error signal when the rate of change in the input signal is sufficiently rapid or the error signal is sufficiently large so as to produce a sufficiently large current flow through the motor 14 to exceed the threshold established by the diode sets 70,74 and 72,76.

Figure 2:
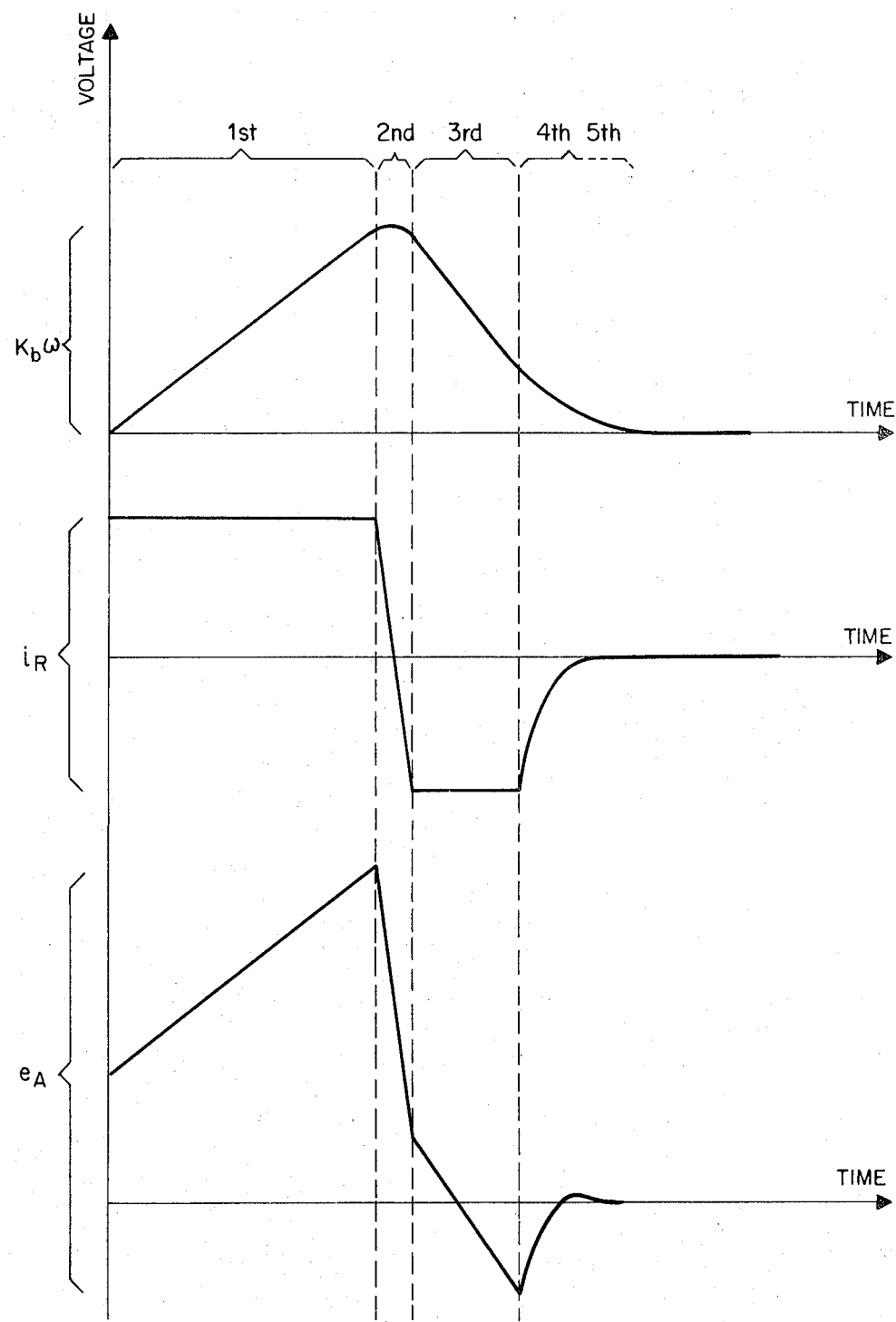
FIG. 2 is a graphical analysis of waveforms characteristic of the embodiment in FIG. 1.

In order to appreciate the cumulative effect of the various feedback circuits of the system, reference is now made to the waveform analysis illustrated in FIG. 2 as supplemented by the following discussion. In this analysis, let $e_A$ represent the voltage that appears across the terminals of the motor 14 which equals the sum of the $iR$ drop plus the back emf $k_B\omega$ of the motor 14. Since $k_B$ is a tachometric co-efficient which is a constant, the waveform for the back emf $k_B\omega$ is essentially that of the waveform of angular velocity $\omega$ as illustrated in FIG. 2. Similarly, the motor resistance R is a constant so that the $iR$ waveform is that of the waveform for the motor current $i$. Assume now, that an input signal has been applied at terminals 22, which has a rate of change such that the threshold established by the threshold diodes 46 and 48 as well as the threshold diodes 70 and 74 will be exceeded.

In the first phase of the response to such an input signal, the current limiting feedback circuit 44 will limit the motor current $i$ to a constant so that the motor voltage $e_A$ is represented by a ramp characteristic of the voltage $k_B\omega$ offset by the voltage $iR$. When the current of the motor 14 drops below the threshold established by the threshold diodes 70 and 74, the first phase ends and the second phase, one of transition between acceleration and deceleration, begins. The system acts as an overdamped control system during this phase. When the current $i$ through the motor reaches the threshold level of the diodes 72 and 76 but of a sign opposite to that of the first phase, the second phase will end and the third phase will begin.

Throughout the third phase, the voltage $e_A$ is a ramp corresponding to deceleration of the motor and a constant current $i$ through the motor 14 which is limited by the threshold diodes 72 and 76. It will be noted that the slope of the ramp is again of a sign opposite to the slope of the ramp of the first phase but of a greater magnitude. This is true since the friction aids deceleration but opposes acceleration. The third phase ends when the current through the motor 14 falls below the threshold established by the threshold diodes 72 and 76.

At this point, two possibilities exist depending upon the parameters of the system. If the velocity is below the velocity threshold established by the diodes 46 and 48, the fourth phase is the final phase with the system operating as a closed loop control system with the same dynamic properties that exist for small signals. However, if the velocity is above the velocity of the threshold established by the diodes 46 and 48, the fourth phase is a deceleration phase for the system acting as a highly overdamped closed loop system as in the second phase. Under these conditions, the fourth phase ends when the velocity equals the velocity threshold established by the diodes 46 and 48 and the system enters the fifth and final phase with the system operating with the same dynamic properties that exist for small changes in input signals. Note that the velocity does not change sign at any time during the step response which is a characteristic required if both overshoot and notching are to be avoided.

Figure 3:
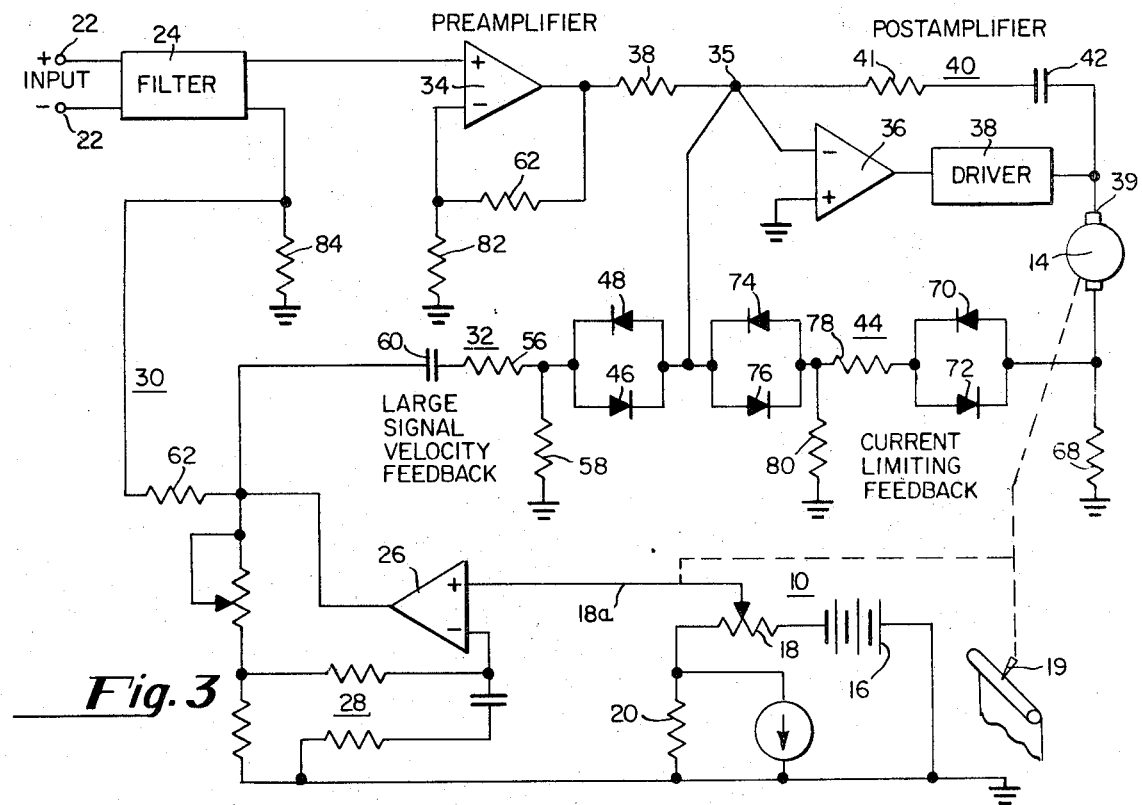
FIG. 3 schematically illustrates another preferred embodiment of the invention.

FIG. 3 illustrates a modification of the system illustrated in FIG. 1 with identical numerals designating identical elements. In the modified system of FIG. 3, the necessity for phase inversion has been eliminated by a different choice of connections at the operational amplifier 34. In effect, the error signal at the preamplifier represents the input signal minus the position and small velocity feedback signal, whereas in FIG. 1, the error signal at the operational amplifier 34 represents the position and small velocity feedback signals minus the input signal. The resistor 64 is now connected to common through a resistor 82, and a resistor 84 connects the resistor 62 to the circuit common.

Figure 4:
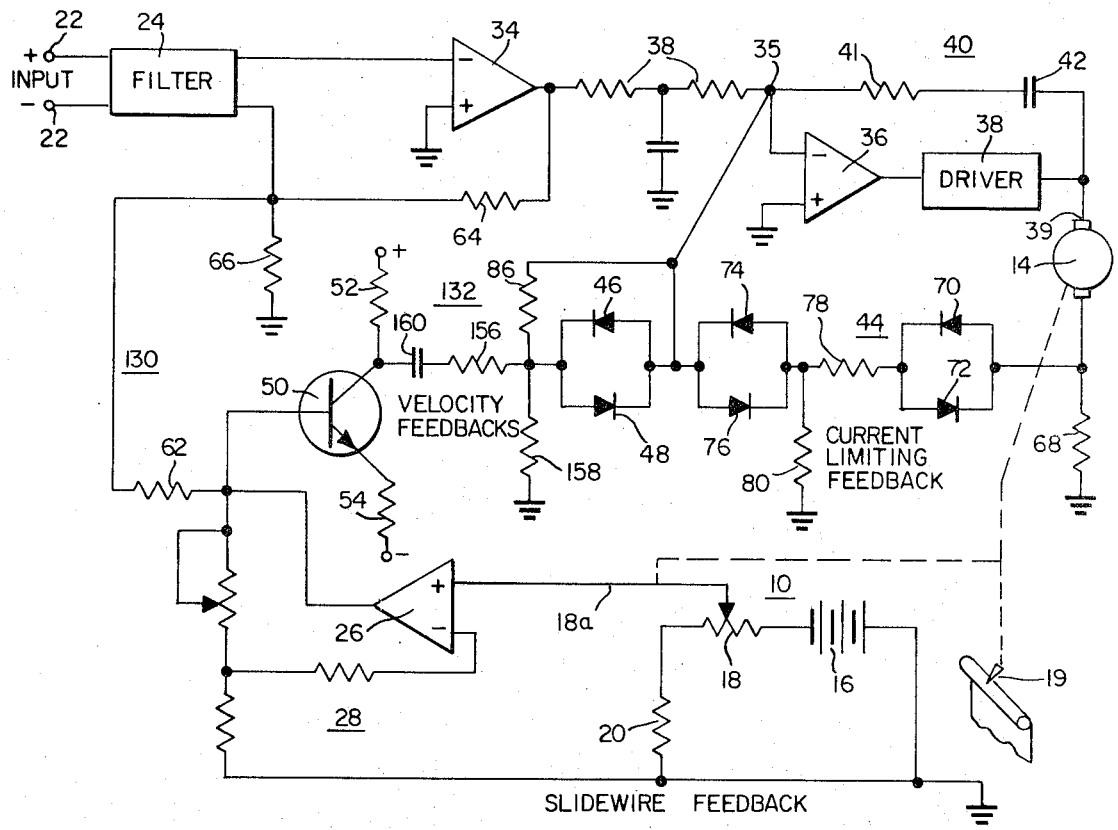
FIG. 4 schematically illustrates still another preferred embodiment of the invention.

FIG. 4 illustrates a somewhat different system with components identical to those of the system illustrated in FIG. 1 bearing identical numeral designations. In the system of FIG. 4, the capacitance of the network 28 associated with the differential amplifier 26 has been eliminated with the result that the output of the differential amplifier 26 is solely proportional to the position of the tap 18a. Accordingly, what was previously termed the position and small velocity feedback circuit 30 is now termed the position feedback circuit 130, since the signal carried is only proportional to the position of the tap 18a. What was previously termed the large velocity feedback circuit 32 is now termed the velocity feedback circuit 132. The velocity feedback circuit 132 actually differentiates the position signal to derive a signal proportional to the velocity of the tap 18a. This differentiation is accomplished by an R.C. network including a capacitor 160, a series resistor 156, and a shunt resistor 158. For small rates of change in the input signal, the threshold diodes 46 and 48 remain nonconductive, and the small velocity feedback signal damping is provided through a small velocity feedback path including an attenuating resistor 86 in shunt with the threshold diodes 46 and 48. When the rate of change of the input signal exceeds a predetermined threshold level, one of the threshold diodes 46 and 48 shunts the attenuating resistor 86 in order to establish a large velocity feedback path for applying a large velocity feedback signal. The system of FIG. 4, which derives velocity feedback from a point in the system after the tap 18a, is advantageous since components of backlash between the motor shaft of the motor 14 and the tap 18a can be rendered inconsequential. Additionally, deadband, due to friction, can be reduced to a negligible level. Furthermore, the extra inertia, noise, and cost of achieving a velocity feedback by a tachometer are eliminated. In the system of FIG. 4, it may be preferred to delete the resistor 86 and add a capacitor connected between the collector of the transistor 50 and the input summing terminal 35.

Figure 5:
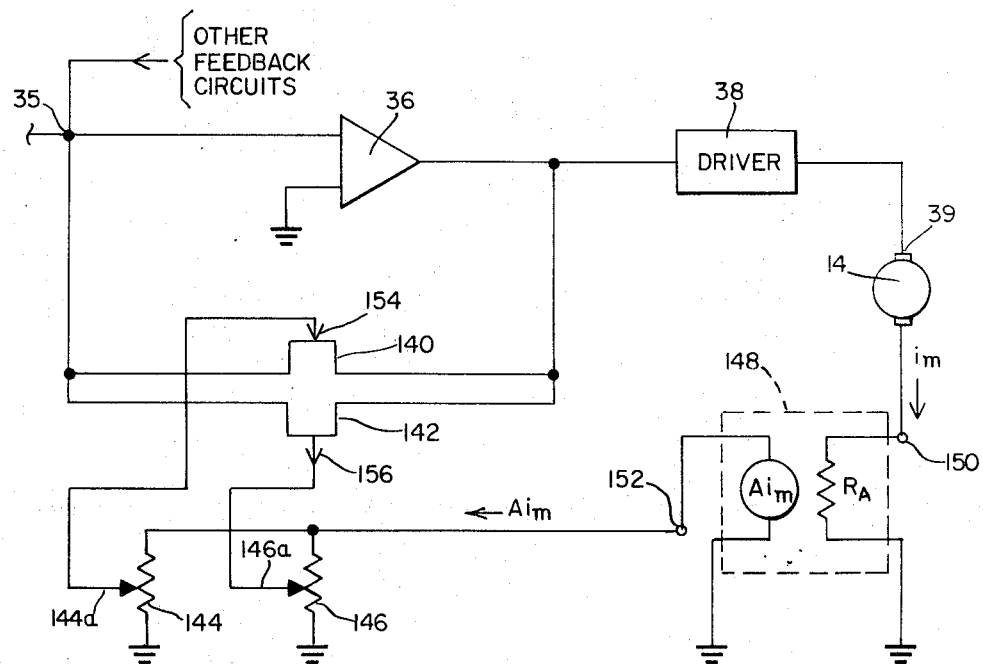
FIG. 5 schematically illustrates yet another preferred embodiment of the invention.

In the null-balance servo system of FIG. 5, a somewhat different means for constraining current is provided. In particular, the current constraining means comprises a pair of parallel connected, complementary enhancement-type FET's (Field Effect Transistors) 140 and 142 which provide a variable impedance feedback path between the output of the operational amplifier 36 and the input summing terminal 35. Feedback means from the motor 14 render the states of the FET's 140 and 142 and thus the impedance of the feedback path responsive to the magnitude of the motor current. As a result, the effective gain of the amplifier 36 is rendered responsive to the magnitude of the motor current so as to limit the motor current whenever the magnitude of the motor current tends to exceed a threshold level.

The feedback means which renders the states of the transistors 140 and 142 responsive to the motor current comprises a pair of potentiometers 144 and 146 and a network 148 shown in equivalent circuit form. The network 148 may be an amplifying network or an attenuating network. By applying the motor current $I_m$ to a network input terminal 150 to obtain a modified motor current $AI_m$ at a network output terminal 152, FET gate control voltages which are related to motor current may be obtained from the potentiometers 144 and 146. When the motor current $I_m$ and thus the modified motor current $AI_m$ are below a prescribed threshold level, the FET control voltages obtained from potentiometer taps 144a and 146a are insufficient to render the FET's 140 and 142 conductive. But when the motor current $I_m$ and thus the modified motor current $AI_m$ tend to exceed the prescribed threshold level, the modified motor current $AI_m$ will establish sufficient FET control voltages at the potentiometer taps 144a and 146a so as to render the FET's 140 and 142 conductive. By providing the two FET's 140 (an N-channel enhancement type) and 142 (a P-channel enhancement type) and the two potentiometers 144 and 146, the variable impedance of the feedback path for the operational amplifier 36 is responsive to both positive and negative motor currents which tend to exceed the threshold level. In particular, the FET 140 is rendered conductive when the gate 154 is made sufficiently positive with respect to circuit common by the modified motor current $AI_m$. Similarly, the FET 142 is rendered conductive when the gate 156 is made sufficiently negative with respect to circuit common by the modified motor current $AI_m$. The thresholds may be easily prescribed by merely properly setting the potentiometer taps 144a and 146a.

When the motor current is below the prescribed threshold level, the amplifier operates in a normal gain region of operation. When the motor current exceeds the prescribed threshold level, one of the FET's 140 and 142 will conduct and the variable impedance feedback path of the operational amplifier 36 will comprise an FET drain-source resistance $R_{ds}$ which may be conveniently approximated by the term $K/V_{gs}$ where K is a constant and $V_{gs}$ is the gate-source voltage. In the absence of other feedback signals from the indicated "other feedback circuits", the gain of the amplifier is proportional to $R_{ds}$ and inversely proportional to $V_{gs}$. The drain-source resistance $R_{ds}$ is therefore equivalent to the output of a feedback divider where $V_{gs}$ is the divisor and K is the divident, and where the output $R_{ds}$ of the divider controls the gain of the amplifier. Since the divisor is related to the motor current through the use of the potentiometers 144 and 146, current constraint which is responsive to the motor current is achieved. It should be appreciated that the actual resistance $R_{ds}$ characteristic is much more complex than a simple inverse proportionality indicated above but such a proportionality serves to illustrate the type of current constraint achieved.

It should also be understood that the input circuitry and preamplifier section of the null-balance servo system, which has not been shown in FIG. 5, may comprise circuitry substantially similar to that of FIG. 1. The other feedback circuits which have been indicated in FIG. 5 comprise feedback circuit means for a small velocity feedback signal and a large velocity feedback signal. The other feedback circuits may, but need not necessarily, include a compensating feedback circuit means 40.

While particular embodiments of the invention have been shown and described it will, of course, be understood that various modifications may be made without departing from the principles of the invention. The appended claims are, therefore, intended to cover any such modification within the true spirit and scope of the invention.

What is claimed is:

1. A null-balance servo system comprising an adjustable circuit element for restoring balance wherein the position of said adjustable circuit element represents a measurement of said unknown signal, a detector responsive to the unbalance of said adjustable circuit element, and a motor for adjusting said adjustable circuit element in a direction to restore balance to said servo system, the improvement residing in said detector comprising:

means for controlling the input for said motor including amplifying means;

means for producing an error signal proportional to the difference between said input signal and a position feedback signal;

means for altering said error signal by a small velocity feedback signal for damping;

means for further altering said error signal by a large velocity feedback signal for damping when the rate of adjustment of said adjustable circuit element exceeds a threshold;

means for applying the altered error signal to said means for controlling the input to said motor, and means for constraining current through said motor to a tolerable level and applying a signal representative of the constrained current to said amplifying means to dominate control of said motor and returning control to said motor to said altered error signal when current constraint is no longer needed.

2. The null-balance servo system of claim 1 wherein said means for further altering said error signal by a large velocity feedback signal comprises a large velocity feedback circuit connected between said adjustable circuit element and said detector including means for establishing a velocity threshold.

3. The null-balance servo system of claim 2 wherein said means for constraining current comprises a motor current feedback circuit between said motor and said detector including means for establishing a motor current threshold.

4. The null-balance servo system of claim 3 wherein said means for establishing a velocity threshold comprises a pair of oppositely poled diodes, one of which is conductive when the threshold level is exceeded.

5. The null-balance servo system of claim 4 wherein said means for establishing a motor current threshold comprises a pair of oppositely poled diodes, one of which is conductive when the motor current threshold level is reached so as to conduct a current limiting feedback signal to said amplifying means.

6. The null-balance servo system of claim 4 wherein said means for establishing a motor current threshold comprises a pair of parallel-connected FET's connected between the output and the input of said amplifying means and gate control means connected between said FET's and the output of said motor, one of said FET's being conductive when the motor current threshold level is exceeded so as to reduce the gain of said amplifying means thereby constraining current applied to said motor to said tolerable level.

7. A null-balance servo system for measuring an unknown electrical quantity as an input signal comprising an adjustable circuit element for restoring balance wherein the position of said adjustable circuit element represents a measurement of said unknown signal, a detector comprising amplifying means responsive to the unbalance of said adjustable circuit element, and a motor for adjusting said adjustable circuit element in a direction to restore balance to said servo system, the improvement residing in said detector comprising:

means for producing a position feedback signal substantially proportional to the position of said adjustable circuit element;

means for producing an error signal substantially proportional to the difference between an input signal and said position feedback signal;

means for driving said motor in response to said error signal;

means for producing a velocity feedback signal proportional to the rate of adjustment of said adjustable circuit element;

means for reducing said error signal by a small velocity feedback signal for damping;

means for further reducing said error signal by a large velocity feedback signal for damping when the rate of adjustment of said adjustable circuit element exceeds a threshold; and means for limiting said error signal in response to the current through the motor when said current reaches a threshold so as to constrain said current to a tolerable level.

8. The improved servo system of claim 7 wherein said means for further reducing said error signal comprises a large velocity signal feedback circuit from said adjustable circuit element for further reducing the error signal in response to the velocity of said adjustable circuit element.

9. The improved servo system of claim 8 wherein said means for constraining current comprises a current limiting feedback circuit from said motor for limiting said error signal in response to the motor current.

10. The improved servo system of claim 9 wherein said large velocity feedback circuit comprises a pair of parallel oppositely poled diodes for establishing a threshold, one of said diodes being conductive when a velocity threshold is exceeded.

11. The null-balance servo system of claim 7 wherein said current limiting feedback circuit comprises a pair of parallel oppositely poled diodes for establishing a motor current threshold, one of said diodes being conductive when the motor current threshold is exceeded.

12. The null-balance servo system of claim 7 wherein said means for constraining current further comprises a pair of complementary FET's connected in parallel relationship between the input and the output of said amplifying means and having gate electrodes connected to said current limiting feedback circuit so as to render one of said FET's conductive when the motor current threshold is exceeded.

* * * * *